US008816842B2

(12) United States Patent
Gookin (10) Patent No.: US 8,816,842 B2
(45) Date of Patent: Aug. 26, 2014

(54) GPS ENABLED RELAY CONTROLLER

(75) Inventor: Michael A. Gookin, Fort Myers, FL (US)

(73) Assignee: Applied Physics Laboratories, LLC, Fort Myers, FL (US)

( * ) Notice: Subject to any disclaimer, the term of this patent is extended or adjusted under 35 U.S.C. 154(b) by 91 days.

(21) Appl. No.: 13/349,298

(22) Filed: Jan. 12, 2012

(65) Prior Publication Data

US 2012/0116604 A1    May 10, 2012

Related U.S. Application Data

(60) Provisional application No. 61/514,421, filed on Aug. 2, 2011.

(51) Int. Cl.
| | |
|---|---|
| G08B 5/00 | (2006.01) |
| B60Q 1/26 | (2006.01) |
| G05B 11/01 | (2006.01) |
| G09F 13/00 | (2006.01) |
| H05B 39/04 | (2006.01) |

(52) U.S. Cl.
USPC ............... 340/468; 340/12.23; 340/815.4; 40/541; 40/550; 40/547; 315/159; 315/360; 315/361; 701/412

(58) Field of Classification Search
USPC .................... 340/468, 815.4, 12.23
See application file for complete search history.

(56) References Cited

U.S. PATENT DOCUMENTS

| | | | | | |
|---|---|---|---|---|---|
| 4,355,309 | A | * | 10/1982 | Hughey et al. | 340/9.16 |
| 5,852,790 | A | * | 12/1998 | Hayes et al. | 701/484 |
| 6,092,318 | A | * | 7/2000 | Arie et al. | 40/547 |
| 6,208,859 | B1 | * | 3/2001 | Halvorson | 455/430 |
| 6,829,852 | B1 | * | 12/2004 | Uehran | 40/451 |
| 7,066,616 | B2 | * | 6/2006 | Howell | 362/145 |
| 7,659,676 | B2 | * | 2/2010 | Hwang | 315/360 |
| 8,013,718 | B2 | | 9/2011 | McCollough, Jr. | |
| 2007/0113441 | A1 | * | 5/2007 | Slowski | 40/550 |
| 2008/0191897 | A1 | | 8/2008 | McCollough | |
| 2008/0218317 | A1 | | 9/2008 | Choi | |
| 2009/0066258 | A1 | | 3/2009 | Cleland et al. | |
| 2010/0013608 | A1 | | 1/2010 | Petrisor et al. | |
| 2011/0078933 | A1 | * | 4/2011 | Lukawitz et al. | 40/204 |

FOREIGN PATENT DOCUMENTS

| | | |
|---|---|---|
| KR | 20100107659 | 10/2010 |
| WO | WO2006080603 | 8/2006 |

* cited by examiner

*Primary Examiner* — Fekadeselassie Girma
(74) *Attorney, Agent, or Firm* — McHale & Slavin, P.A.

(57) ABSTRACT

A GPS enabled relay controller that interfaces with an electronic device, such as a street light, barricade light, refrigerator, and other similar applications for turning off power to an electronic device for energy savings. The relay controller invokes quantification of refractive photon diffusion to switch between on and off an electronic device based upon refracted photons diffused at the surface of the earth at a particular location and based upon sampling at the Earth's surface from before civil twilight start until after sunrise and from before sunset until after civil twilight end.

12 Claims, 7 Drawing Sheets

GPS ENABLED RELAY CONTROLLER

CROSS-REFERENCE TO RELATED APPLICATION

This application is based upon and claims priority of U.S. Provisional Patent Application No. 61/514,421, filed on Aug. 2, 2011, the contents being incorporated herein by reference.

FIELD OF THE INVENTION

The present invention relates to the field of outdoor lighting and, more particularly, to a GPS enabled relay controller for outdoor lighting to efficiently control the nighttime lighting based upon a satellite clock and specific latitudinal and longitudinal locations.

BACKGROUND OF THE INVENTION

At the present time there are approximately 131 million streetlights and outdoor area lights in the USA. If all of those lights were turned off for an additional minute per day, 250,000,000 lb $CO_2$ would be prevented from entering the atmosphere per year and result in $79,000,000 in yearly energy savings.

Current street light controllers are constructed and arranged to switch the street lights on and off by detection of ambient light or by the use of a conventional clock timer. Turning off a street light when ambient light is available reduces unnecessary energy consumption and extends the life of the street light. The existing controllers that detect light implement photoresistors that absorb photons at a particular wavelength. As the sun rises the number of photons absorbed increases and the controller will turn off the street light at a predetermined absorption rate.

Although photoresistor light switches exist, the use of photoresistors has numerous shortcomings. For instance, photoresistors decay over time resulting in unreliable light switches. As described supra, photoresistor decay that disrupts the timing of the implemented light switches by even a minute can cost millions of dollars per year in lost energy.

An additional shortcoming occurs because photoresistor light switches include a housing with a window that protect the electrical components from bearing the elements, the window permits photons to pass through the housing and strike the photoresistor. In many cases, the window accumulates dirt or other impediments such as snow or lens discoloration that inhibits photons from reaching the photoresistor, thereby decreasing the effectiveness of the photoresistor. In addition, the window must be pointed in a particular direction.

Furthermore, photoresistors are inefficient consumers of electricity.

DESCRIPTION OF THE PRIOR ART

U.S. Patent Publication No. 2008/0191897 discloses a field programmable electric street light controller that allows automatic street light on and off characteristics to be field programmable using RFID technology, lamp current magnitude recording, auxiliary sensor input, diagnostic alarming and data storage for later retrieval in a remote electric street lighting monitoring system.

U.S. Patent Publication No. 2009/0066258 discloses a method and apparatus associated with monitoring and controlling streetlights including monitoring light levels and voltage levels at corresponding streetlights and controlling the streetlights to set or maintain a particular light output at the respective streetlights or providing power consumption estimates for respective street lights.

U.S. Patent Publication No. 2010/0013608 discloses an RNSS based street light controller pluggable into a standard electrical interface of a street light for drawing power and controlling a lamp of the street light eliminates the need for photosensors, wiring terminals and related components.

What is lacking in the art is a GPS based light controller capable of turning on and off a light dependent upon the mathematically calculated magnitude of naturally occurring ambient luminous flux at a particular sunrise or sunset at a particular latitude and longitude.

SUMMARY OF THE INVENTION

The present invention is a GPS enabled relay controller that interfaces with an electronic device, illustrated herein as a street light. It should be noted that the controller may be adapted to most any outdoor lighting device including barricade lights, security lights, Christmas lights, and other similar applications for turning power on and off for energy savings. The relay controller invokes quantification of refractive photon diffusion to switch between on and off an electronic device, including an electronic device having an artificial light when the magnitude of naturally occurring ambient luminous flux is greater than that produced by the artificial light of the electronic device, namely the light produced by a street light.

Accordingly, it is an objective of the instant invention to provide a GPS enabled relay controller that switches on and off based upon the calculated mathematically predicted magnitude of naturally occurring ambient light level for a particular latitude and longitude.

It is a further objective of the instant invention to provide a controller that can operate without the need for directional positioning of a light sensor window.

It is another objective of the instant invention to disclose a controller that automatically calculates the exact time to operate based upon latitude, longitude and date wherein the controller will operate at different times whether located in Maine or Costa Rica for example.

It is still another objective of the instant invention to disclose a controller that is not affected by dirt or debris, snow, ice, live or dead animals, live or dead horticulture, paint, or wood.

It is yet still another objective of the instant invention to disclose a controller that can be permanently pre-programmed to switch at any desired magnitude of naturally occurring ambient luminous flux as a function of latitude, longitude and date irrespective of where on Earth the device will be used.

It is yet still another objective of the instant invention to disclose a controller that can be programmed to operate at civil twilight, i.e. when the center of the sun is geometrically 6 degrees below the horizon from the controller.

It is yet still another objective of the instant invention to disclose a controller that can be programmed to operate at nautical twilight, i.e. when the center of the sun is geometrically 12 degrees below the horizon from the controller.

It is another objective of the instant invention to disclose a controller that can be programmed to operate at a computational sunrise and sunset.

It is a further objective of the instant invention to provide a controller that can switch on an off an artificial light source at a more opportune time.

It is an objective of the instant invention to provide a controller to switching off outdoor lighting at opportune times for reducing large quantities of $CO_2$ emissions from entering the atmosphere.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

The inventor has devised a GPS enabled relay controller adapted to control flow of electricity to an electronic device to exploit the fraction of time between civil twilight start to sunrise when the magnitude of naturally occurring ambient light is greater than the magnitude of artificial light produced by an outdoor lighting device. In a preferred embodiment, the relay controller may be coupled electrically with a power grid. The delivery of electrical power from the power grid to an electrical device is controlled by the GPS enabled relay controller.

Figure 1:
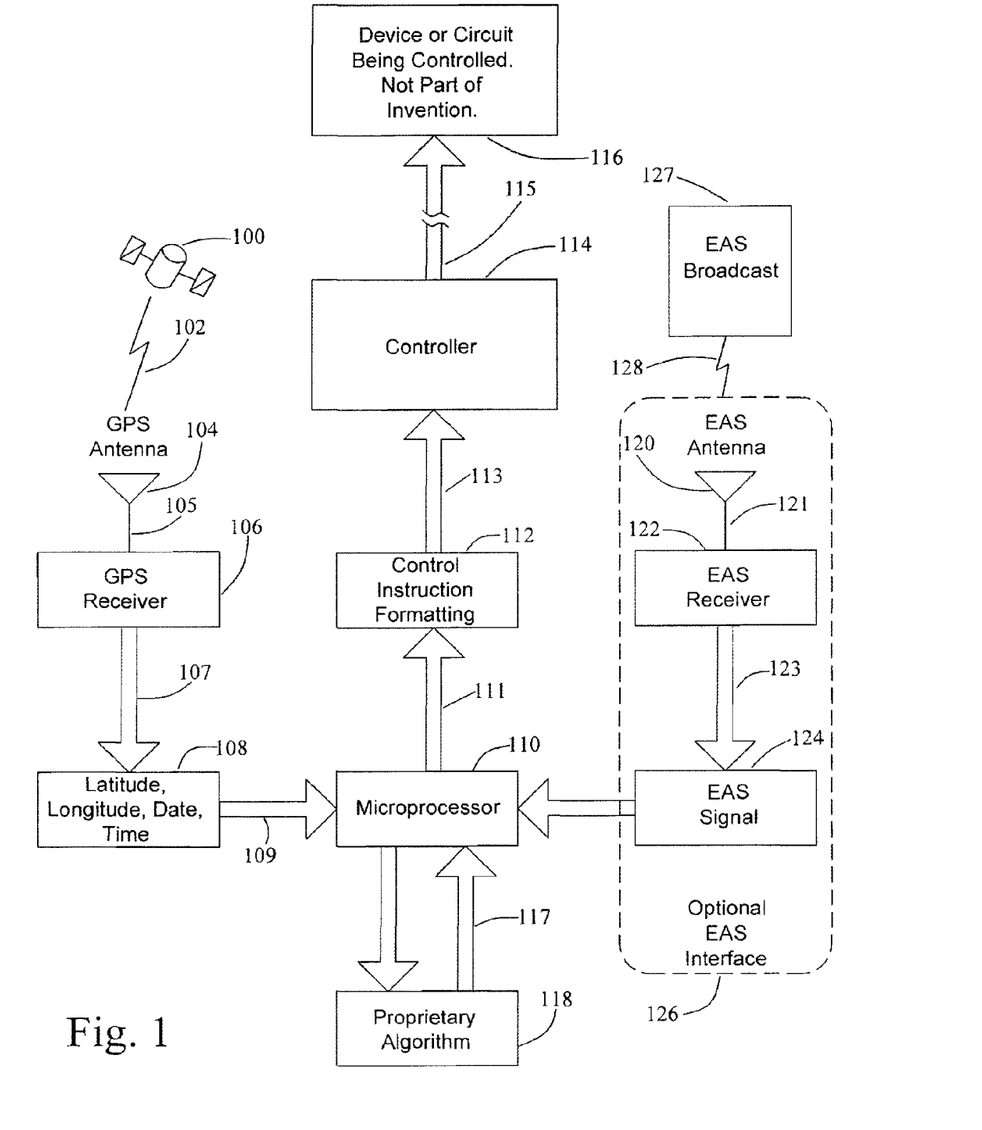
FIG. 1 is a flow chart showing an exemplary GPS enabled streetlight switch.

With reference to FIG. 1, a GPS enabled streetlight switch is shown. A GPS antenna 104 receives GPS radio signals 102 from a plurality of GPS satellites 100. The GPS antenna 104 electrically coupled to a GPS receiver 106 provides the GPS receiver 106 radio signals 105 acquired by the GPS antenna 104. The GPS receiver 106 may interpret the received GPS radio signals 105 and output location signals 108 to a microprocessor 110. The location signals 108 may include the current latitude, longitude, date and time.

Various algorithms are loaded into the microprocessor 110. The algorithms are created by compiling a dataset of desired outputs and running regression based on the input parameters which always include Date, Latitude and Longitude and will also include the one or more parameters having relevance to optimal switching time of whatever is being switched. Regression is run sequentially across the various parameters in logical order until the desired output and be recreated based on the available input parameters. Each algorithm runs calculations and formulas across each input parameter to calculate the resulting output. Most commonly a series of algorithms are run where each preceding function calculates the required function for the successive calculation repeating this process until the desired output is acquired.

To create an algorithm to control a system which uses electric resistance heat to warm an outdoor paved surface, data is collected regarding seasonal temperature swings. The first calculation in this situation is an IF argument to see if the date is within the range of dates when freezing temperatures are known to exist at the locale and it will lock the system on all dates outside of that range to prevent a faulty thermostat from operating the system in the summer months.

An additional EAS interface may exist as shown herein. An Emergency Alert System (EAS) antenna 120 receives EAS radio signals 128. The EAS antenna 120 electrically coupled to an EAS receiver 122 provides the EAS receiver 122 EAS radio signals 121 acquired by the EAS antenna 120. The EAS receiver 106 may interpret the received EAS radio signals 121 and output edited EAS radio signals 108 to the microprocessor 110. In the event of an emergency, the streetlight may be turned on by the controller. Additionally, the EAS Interface can be used to switch lights, sirens, redundant (standby or backup) power systems, computer backups, storm shutters, and other operations requisite to emergency conditions predicated upon the specific type of emergency at the subject locale. If the first calculation determines that the date is within the range of dates when freezing temperatures are known to exist at the locale, it will then determine what time(s) of day freezing temperatures are expected or not expected based on date and allow the system to function as it otherwise normally would. A signal, such as a blizzard warning, from the EAS would be able to override the lockout in the event of off-season events warranting operation of the system.

The microprocessor 110 shall compute whether, based upon the received location signals 108, the magnitude of naturally occurring ambient luminous flux is greater than that produced by the artificial light of the streetlight. In the event that the magnitude is of the naturally occurring ambient luminous flux is calculated by the microprocessor 110 to be larger than the artificial light of the street light, the microprocessor will turn off the streetlight. The calculation for determining particular location's ambient luminous flux is based upon refracted photons diffused at the surface of the earth at a particular location. The calculation is based on daily sampling at the Earth's surface from before civil twilight start until after sunrise and from before sunset until after civil twilight end during atmospheric conditions in a range from very high pressure with clear conditions to very low pressure with severe storm conditions. To determine the calculation of ambient luminous flux, regression is performed to determine time as a function of luminous flux. The data sets are transposed where the independent variable is time. Regression is performed to determine luminous flux as a function of time. The application of luminous flux as a function of time is applied irrespective of the intended earth location of the streetlight switch eliminating the need for expensive maintenance.

The microprocessor 110 shall electrically communicate 113 with a controller 114 to turn on and turn off a streetlight based upon the ambient luminous flux.

Figure 2:
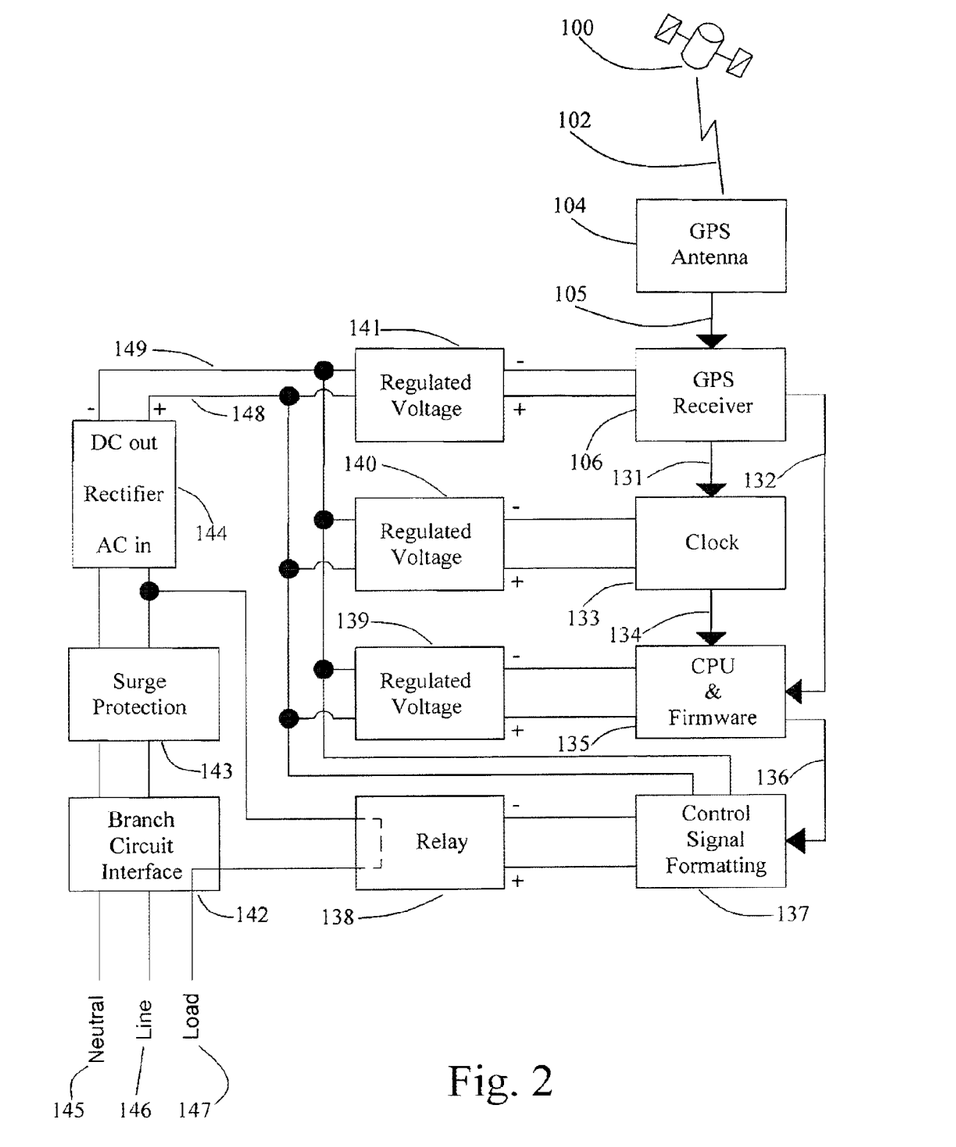
FIG. 2 is a flow chart showing an exemplary GPS enabled streetlight switch.

As shown in FIG. 2, the GPS antenna 104 receives GPS radio signals 102 from a plurality of GPS satellites 100. The GPS antenna 104 electrically coupled to a GPS receiver 106 provides the GPS receiver 106 radio signals 105 acquired by the GPS antenna 104. The GPS receiver 106 is electrically drives 131 a clock 133 for providing clock pulses to a CPU 135 having onboard firmware. The GPS receiver 106 is additionally coupled directly to the CPU 135. The CPU 135 outputs a control signal 136 that drives control signal formatting 137 that operatively actuates an electrically driven relay 138.

An AC power source showing a line 146 and neutral 145 interfacing with a branch circuit interface 142. The AC power source passing through surge protection 143 couples to a rectifier circuit 144. The rectifier circuit 144 outputting DC power 148 and 149 to the system, the system shall regulate the voltage, illustrated herein as regulated voltage 138, 139, 140, 141.

Figure 3:
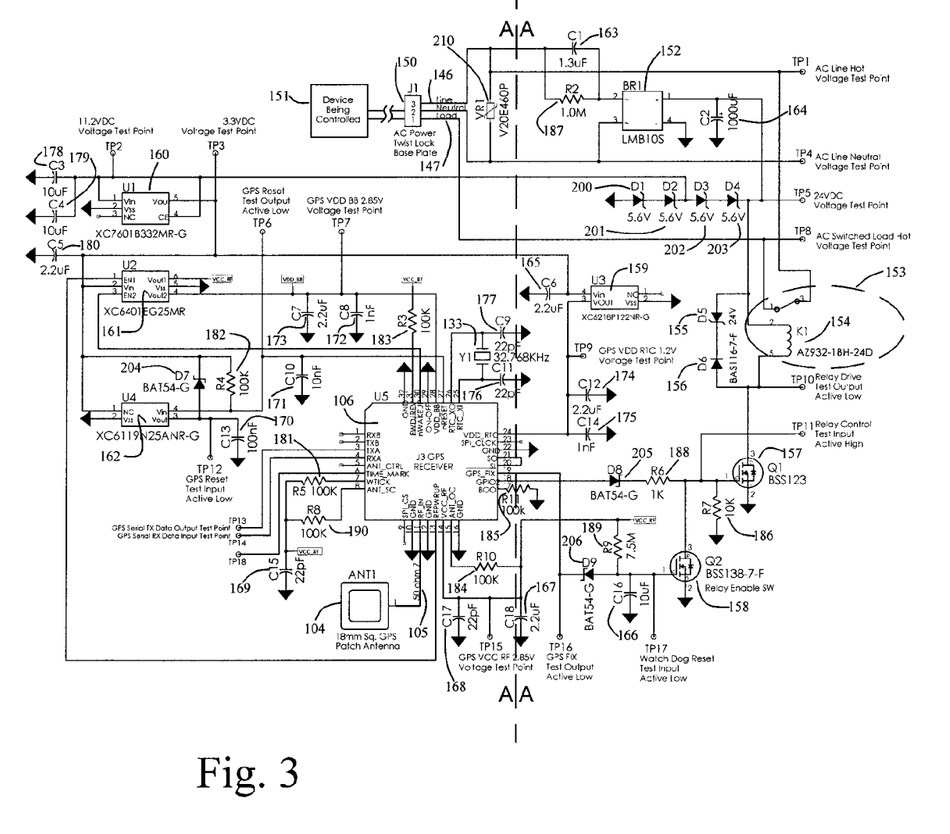
FIG. 3 is an electrical schematic diagram of the exemplary GPS enabled streetlight switch.
Figure 4:
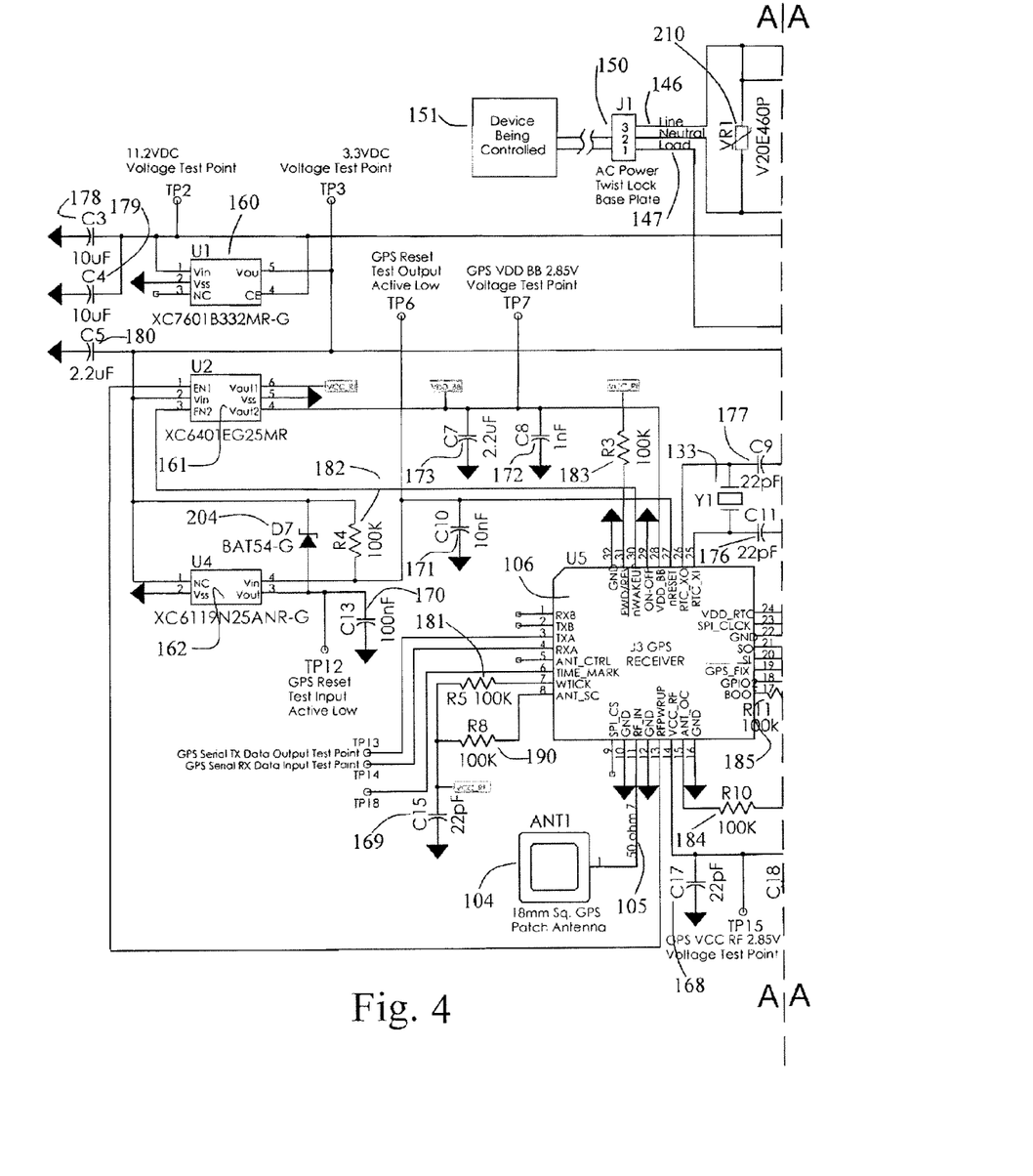
FIG. 4 is a portion of the electrical schematic diagram of the exemplary GPS enabled streetlight switch of FIG. 3.
Figure 5:
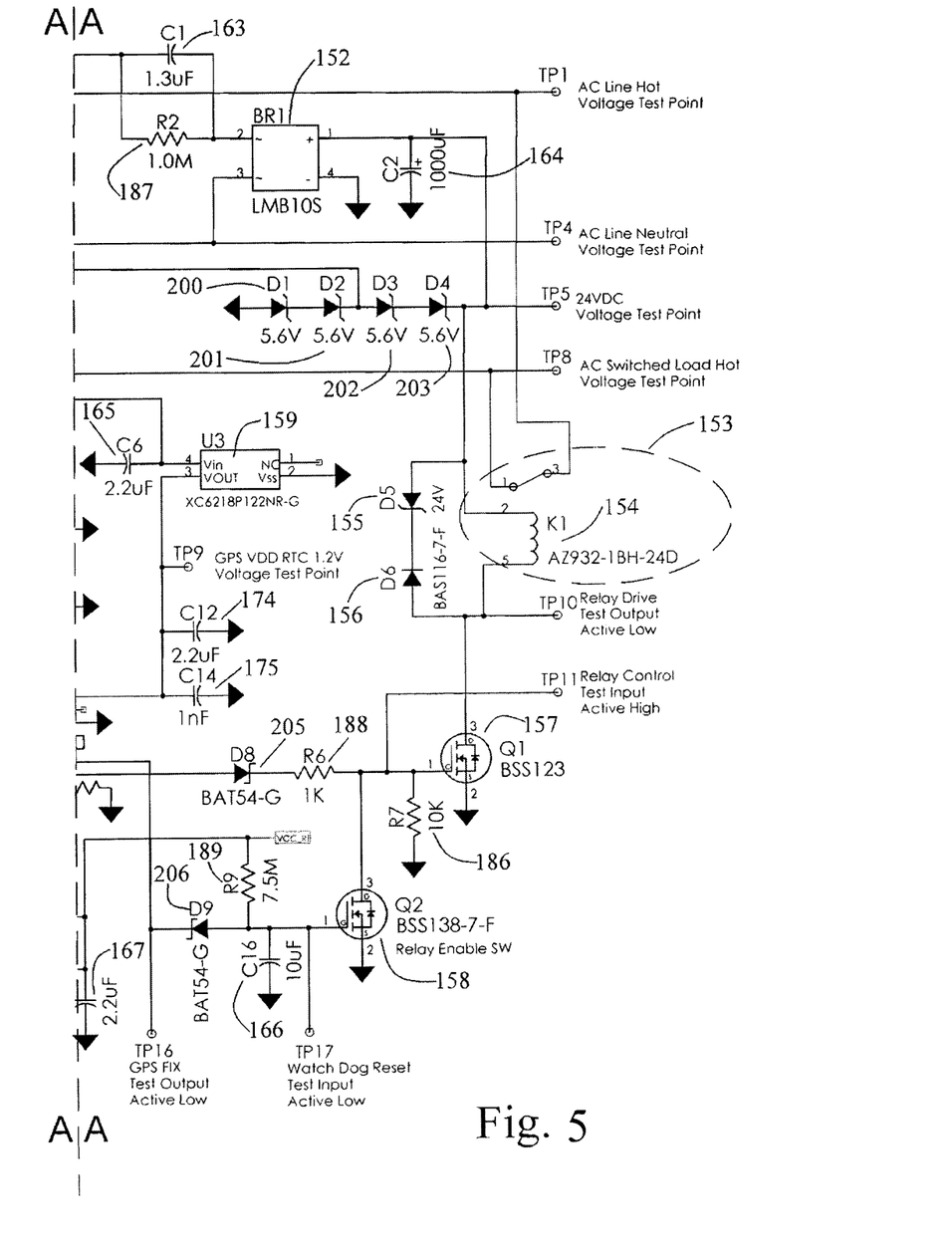
FIG. 5 is a portion of the electrical schematic diagram of the exemplary GPS enabled streetlight switch of FIG. 3.
Figure 6:
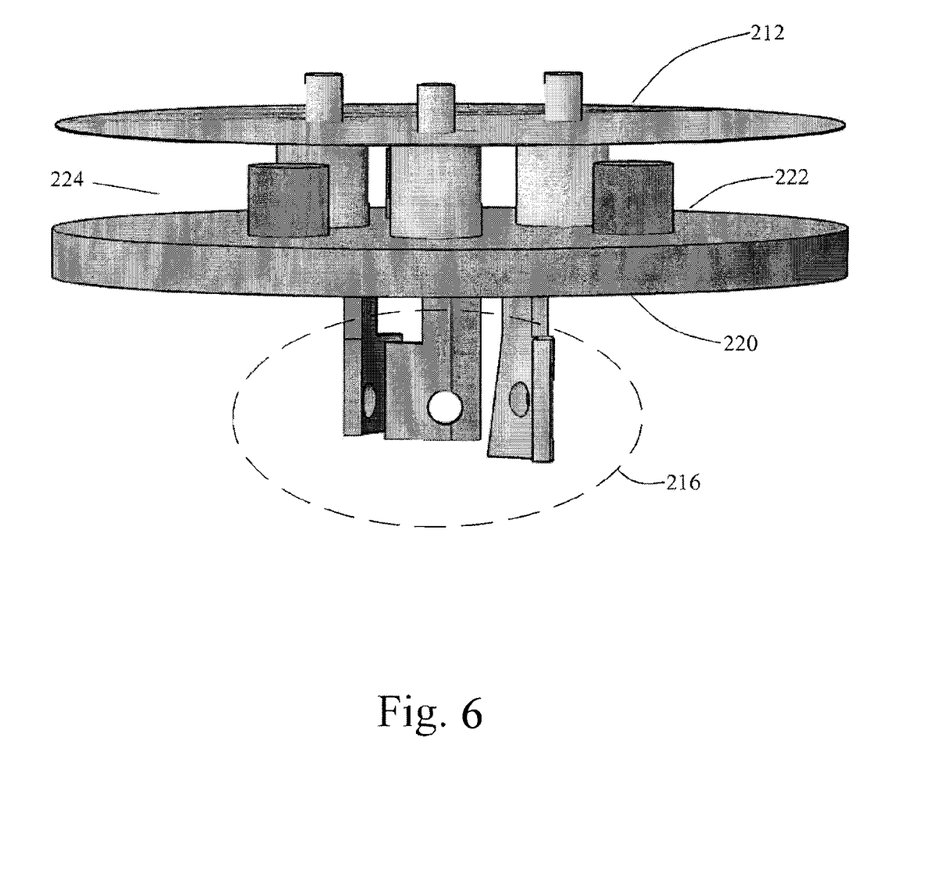
FIG. 6 is a perspective view of an exemplary twist lock electrical interface.
Figure 7:
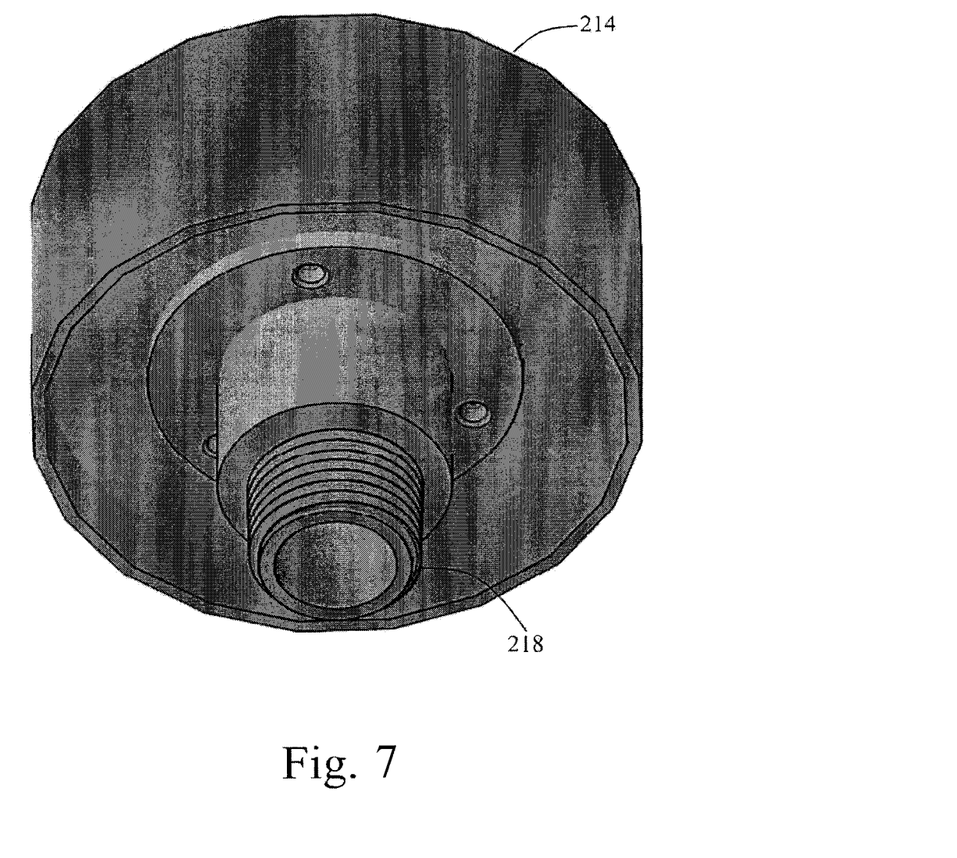
FIG. 7 is a perspective view of an exemplary wire-in electrical interface.

FIG. 3 depicts the circuit of the relay controller which can be viewed in enlarged FIGS. 4 & 5. FIG. 4 is a schematic view of the left portion of FIG. 3; FIG. 5 is the right portion of FIG. 3.

Seen in FIGS. 4 & 5 is the relay controller. Provided is a three prong 150 AC power twist lock base plate of the GPS enabled streetlight switch constructed and arranged to twistingly lock to an electrical device 151, the switch capable of regulating power by switching on and off the power to an electrical device, the electrical device illustrated herein as a streetlight, barricade, refrigerator, and other similar electrical devices. The switch 153 includes a relay 154, a zener diode 155 and a diode switch 156. The Mosfet 157 transistor amplifies the electronic signal that causes switching of the relay for turning on and off the electrical device. A second Mosfet 158 is constructed and arranged as a relay enable for relay 154.

A plurality of voltage regulators 159, 160, 161 in electrical communication with the system and 162 are constructed and arranged to maintain a constant voltage to regulate the GPS receiver 106, the CPU 135 and the clock 133. Exists a plurality of capacitors 163-180 in electrical communication with the system for storing electrical charge. Additionally, exists a plurality of resistors 181-190 in electrical communication with the system for providing electrical resistance. Exists a plurality of zener diodes 200-203 in electrical communication with the system. Further exists a plurality of Schottky diodes 204-206. Exists a variable resister 210 between line 146 and neutral 145.

As shown in FIGS. 3-7, the instant invention is made by assembling together the GPS antenna 104, the GPS receiver 106, one or more microprocessors 110, memory (not shown), a power supply (not shown) and an electromechanical relay 153 onto an upper surface 222 of a base plate 224, the upper surface 22 of the base plate includes a circuit board 212, said base plate is encapsulated in a thermoplastic housing 214 with electrical interface relative to a lower surface 220 of said base plate 224, said electrical interface may include the specific application such as "twist-lock" 216 or "wire-in" 218. Various models of the invention accommodate various line voltages and ampacities. Invention is programmed with software derived from astrophysics algorithms 118. Optional add-ons include EAS interface 126 and battery backup (not shown).

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A Global Positioning System (GPS) enabled relay controller comprising:
   a housing defined by a base plate having a lower surface and an upper surface, said lower surface including an electrical interface for coupling to an electrical source and lighting element;
   a GPS receiver secured to said upper surface of said base plate and electrically coupled to said electrical source, said GPS receiver receiving a time signal and a latitude and longitudinal position;
   a microprocessor coupled to said GPS receiver, said microprocessor including an algorithm being a product of quantification of refractive photon diffusion, stored within a memory mathematically calculating a desired time by regression as a function of latitude, longitude and date of a desired naturally occurring ambient light magnitude based upon the received signal data and latitude and longitude position of said GPS receiver;
   a relay controller attached to said microprocessor, said relay controller decoupling said electrical source to said lighting element when said microprocessor indicates said desired time based upon the magnitude of the predicted naturally occurring ambient light level greater than a magnitude produced by said lighting element at the latitude and longitudinal position of said GPS receiver; and
   a non-metallic cover sealing said GPS receiver, said relay and microprocessor to said base plate, wherein said lighting element is turned on or off relative to the GPS receiver global position;
   calculate whether said date is within a range of dates when freezing temperatures are known to exist at said latitude and said longitude; and
   wherein calculation of said freezing temperatures known to exist at said latitude and said longitude locks said relay controller to prevent damage to said GPS enabled relay controller.

2. The GPS enabled relay controller of claim 1 wherein said electrical interface is a twist lock.

3. The GPS enabled relay controller of claim 1 wherein said electrical interface is a wire-in.

4. The GPS enabled relay controller of claim 1 wherein said algorithm stored within memory calculates time when said magnitude of said naturally occurring ambient luminous flux exceeds said magnitude of an artificial luminous flux produced by an electric light at a point on the Earth as a function of latitude, longitude and day.

5. The GPS enabled relay controller of claim 1 further including:
   an Emergency Alert System (EAS) interface secured to said upper surface of said base plate and an output of said EAS interface electrically coupled to said electrical source, said EAS interface includes an EAS receiver coupled to said microprocessor; and
   wherein said EAS receiver output to said microprocessor overrides switching of said relay controller.

6. A GPS enabled relay controller comprising:
   a housing defined by a base plate having a lower surface and an upper surface, said lower surface including an electrical interface for coupling to an electrical source and lighting element, said upper surface including an electrical interface for coupling to a circuit board;
   a GPS receiver secured to said upper surface of said base plate and electrically coupled to said electrical source, said GPS receiver receiving a signal data and a latitude and longitudinal position a microprocessor coupled to said GPS receiver, said microprocessor including an algorithm being a product of quantification of refractive photon diffusion, stored within a memory for calculating desired times as a function of latitude, longitude and date to switch said lighting element based upon said signal data, latitude, and longitude of said GPS receiver, said algorithm calculating as a plus or minus fraction of a lapse in time between a civil twilight start and a sunrise;
   a relay controller attached to said microprocessor, said relay controller decoupling said electrical source to said lighting element when said microprocessor indicates said desired time based upon the magnitude of the predicted naturally occurring ambient luminous flux that exceeds a magnitude of artificial luminous flux produced by said lighting element at the latitude and longitudinal position of said latitude and longitudinal position of said GPS receiver; and
   a non-metallic cover sealing said GPS receiver and microprocessor to said base plate, wherein said lighting element is turned on or off relative to the GPS receiver global position;
   calculate whether said date is within a range of dates when freezing temperatures are known to exist at said latitude and said longitude; and
   wherein calculation of said freezing temperatures known to exist at said latitude and said longitude locks said relay controller to prevent damage to said GPS enabled relay controller.

7. The GPS enabled relay controller of claim 6 wherein said electrical interface is a twist lock.

8. The GPS enabled relay controller of claim 6 wherein said electrical interface is a wire-in.

9. The GPS enabled relay controller of claim 6 wherein said algorithm stored within memory calculates time when said magnitude of naturally occurring ambient luminous flux exceeds said magnitude of artificial luminous flux produced by said lighting element at a point on the surface of the Earth as a function of latitude, longitude and day.

10. The GPS enabled relay controller of claim 6 further including:
    an EAS interface secured to said upper surface of said base plate and an output of said EAS interface electrically coupled to said electrical source, said EAS interface includes an EAS receiver coupled to said microprocessor; and
    wherein said EAS receiver output to said microprocessor overrides switching of said relay controller.

11. A GPS enabled relay controller comprising the steps of:
    receiving signals that correlate a latitude, longitude, date and time, wherein said time is calculated as a function of latitude, longitude and date;
    calculating time intervals when said magnitude of naturally occurring ambient luminous flux at a point on the surface of Earth will exceed said magnitude of artificial luminous flux produced by an electrical element at said point on the surface of Earth as a function of latitude, longitude and day;
    regulating power to an electrical device by way of a relay controller, said relay controller operates by permitting power to an electrical device and prohibiting power to said electrical device; and
    wherein said relay controller controls an electrical device according to the received location Signals in a normal operation;
    calculating whether said date is within a range of dates when freezing temperatures are known to exist at said latitude and said longitude; and
    wherein calculation of said freezing temperatures known to exist at said latitude and said longitude locks said relay controller to prevent damage to said GPS enabled relay controller.

12. The GPS enabled relay controller of claim 11 further comprising the steps of:
    receiving an EAS signal;
    overriding said normal operation for said regulation of power to an electrical device; and
    wherein the GPS enabled relay controller controls an electrical device according to the received EAS signal in a special operation.

* * * * *